E. J. VON HENKE.
ELECTRIC WELDING MACHINE.
APPLICATION FILED MAY 14, 1917.
1,266,084.
Patented May 14, 1918.
3 SHEETS—SHEET 1.
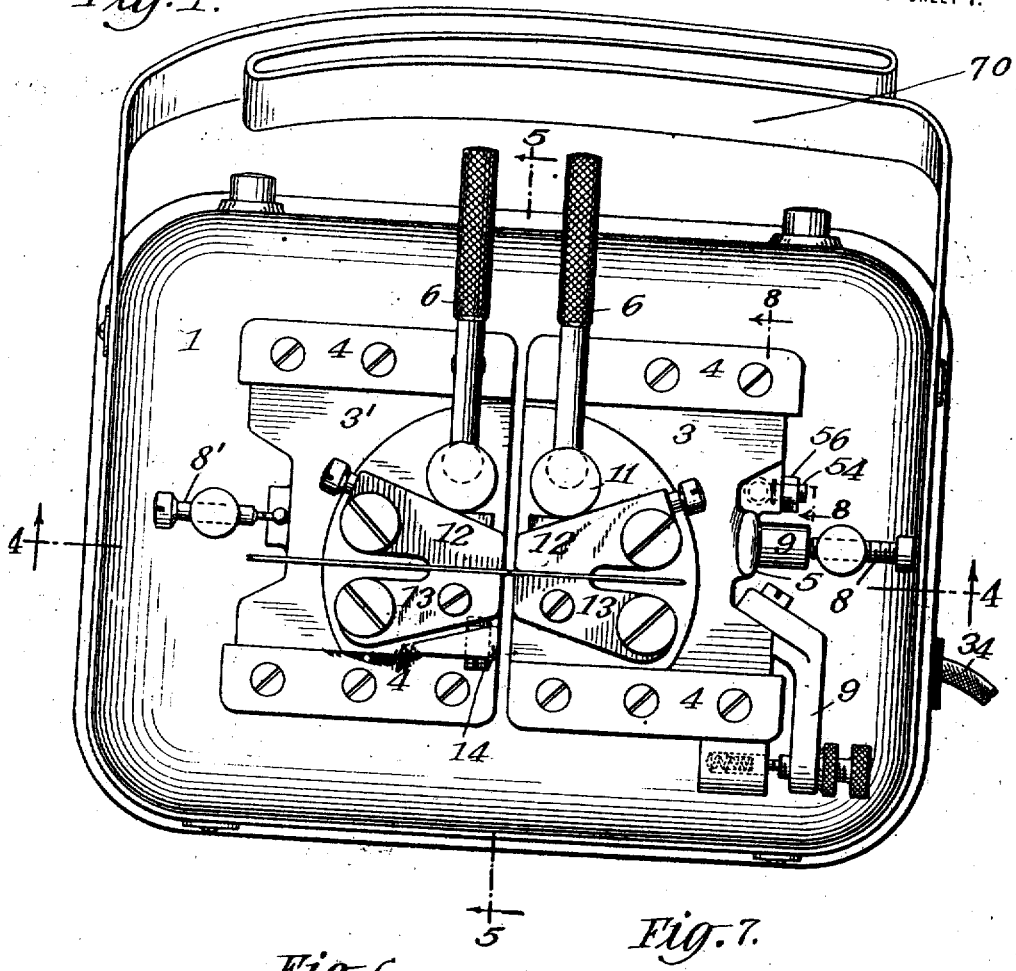
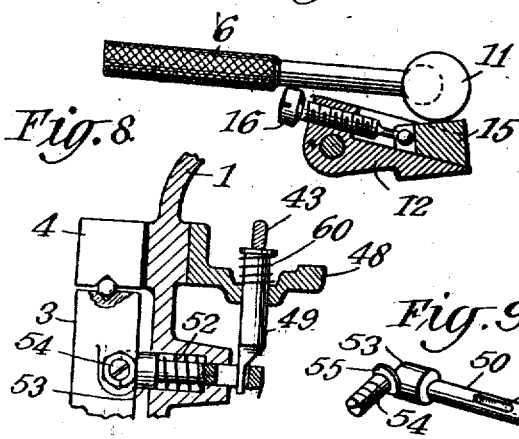
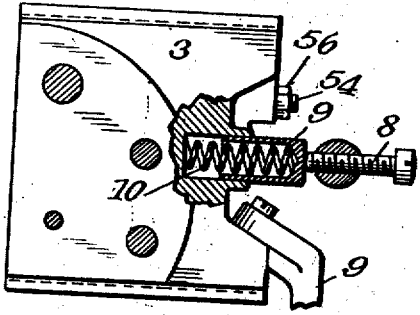
INVENTOR
Edmund J. Von Henke
BY
Townsend & Decker
ATTORNEYS

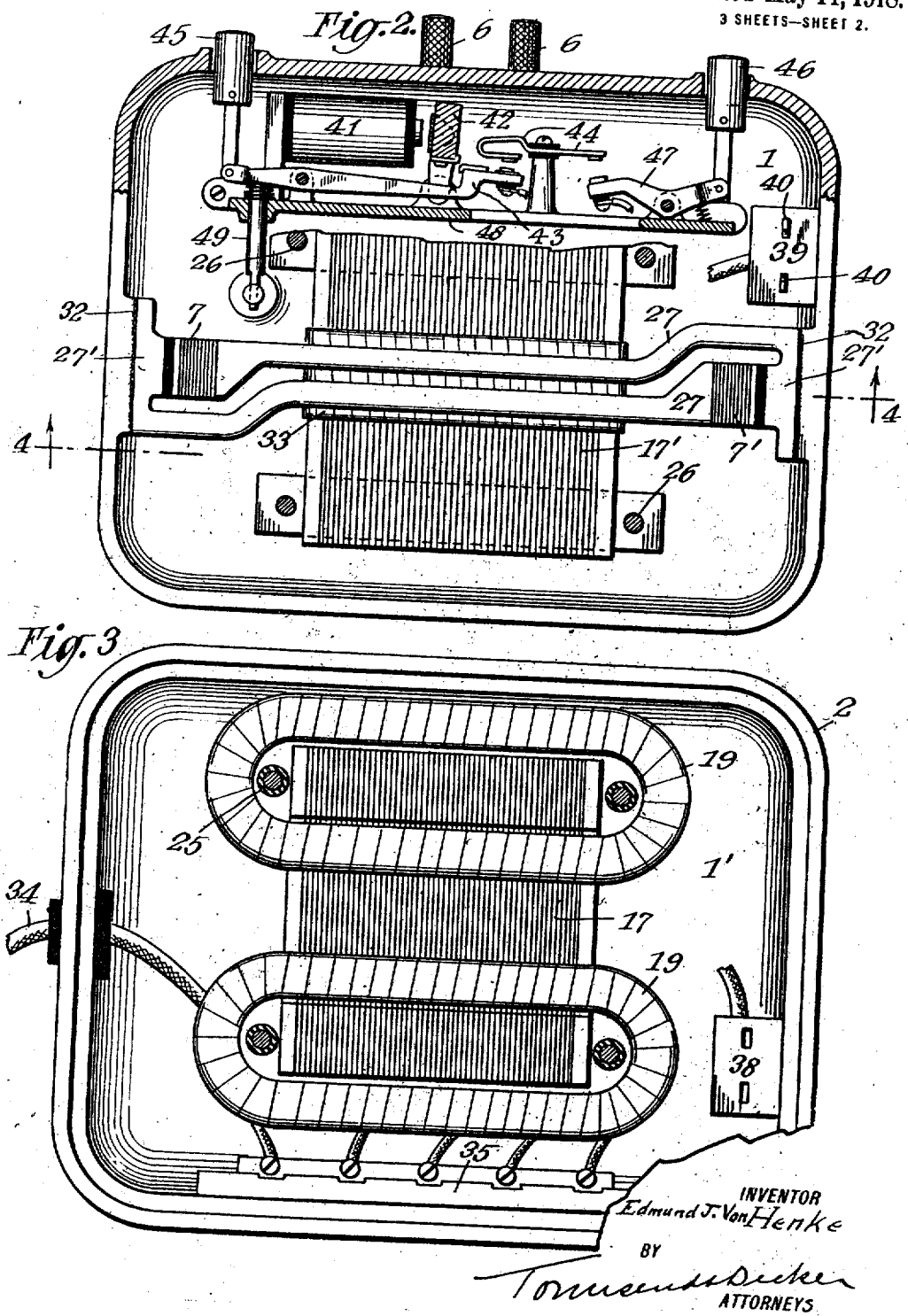

E. J. VON HENKE.
ELECTRIC WELDING MACHINE.
APPLICATION FILED MAY 14, 1917.

1,266,084.

Patented May 14, 1918.
3 SHEETS—SHEET 3.

INVENTOR
Edmund J. Von Henke
BY
Townsend&Dieke
ATTORNEYS.

UNITED STATES PATENT OFFICE.

EDMUND J. von HENKE, OF LYNN, MASSACHUSETTS, ASSIGNOR TO THOMSON ELECTRIC WELDING COMPANY, OF LYNN, MASSACHUSETTS, A CORPORATION OF MASSACHUSETTS.

ELECTRIC WELDING-MACHINE.

1,266,084.                Specification of Letters Patent.         Patented May 14, 1918.

Application filed May 14, 1917. Serial No. 168,331.

*To all whom it may concern:*

Be it known that I, EDMUND J. VON HENKE, a citizen of the United States, and a resident of Lynn, in the county of Essex and State of Massachusetts, have invented certain new and useful Improvements in Electric Welding-Machines, of which the following is a specification.

My invention relates to the construction of electric metal working apparatus embodying a transformer and suitable workholding clamps and operating devices therefor whereby electric welding or other metal working operations may be performed.

One of the purposes of the invention is to provide complete protection together with compactness and accessibility by incasing the parts and mounting them on or in a sectional casing in the manner hereinafter more particularly described.

Another feature of my invention relates to the construction of a two-turn secondary for the incased transformer in such manner that the casing thereof shall form a part of the secondary. In this manner the weight is lessened so that in the smaller sizes especially the machine is readily portable and may be easily carried about by the operator. The compactness of the machine as a whole also enhances its portability.

The invention further relates to the provision of an automatic stop for the movable platen adapted to hold the same in retracted position combined with means coöperating with said stop and adapted to withdraw the same automatically by the act of closing the primary circuit for the purpose of starting the welding operation.

To the above ends the invention consists in the construction of devices and combination of parts as hereinafter more particularly described and then specified in the claims.

In the accompanying drawings my invention is shown embodied in one of the forms which it may take in practice.

Figure 1 is a front elevation of the apparatus.

Fig. 2 is a rear elevation of the section of the casing carrying the secondary and switches looking into said section.

Fig. 3 is an elevation of the other section of the casing carrying the primary coil turned bottom side up and looking into said section of casing.

Fig. 6 shows in detail one of the clamps for the welder with its operating cam.

Fig. 7 is a partial section through the rear portion of the spring-operated platen carrying one of the two sets of workholding clamps.

Fig. 8 is a detail vertical section through the devices which operate upon the stop or catch for the movable platen.

Fig. 9 is a perspective view of said catch showing its relation to an adjustable stud or screw for the platen.

1 indicates the front and 1' the rear section of the casing. Said casing is constructed preferably of some good conducting and non-magnetic material at least as to its front half 1, which comprises a part of the two-turn secondary of the transformer. One of the sections, as for instance the rear half, is furnished with a proper lip or flange 2 to form a good joint where the edges of the sections fit together.

Figure 4:
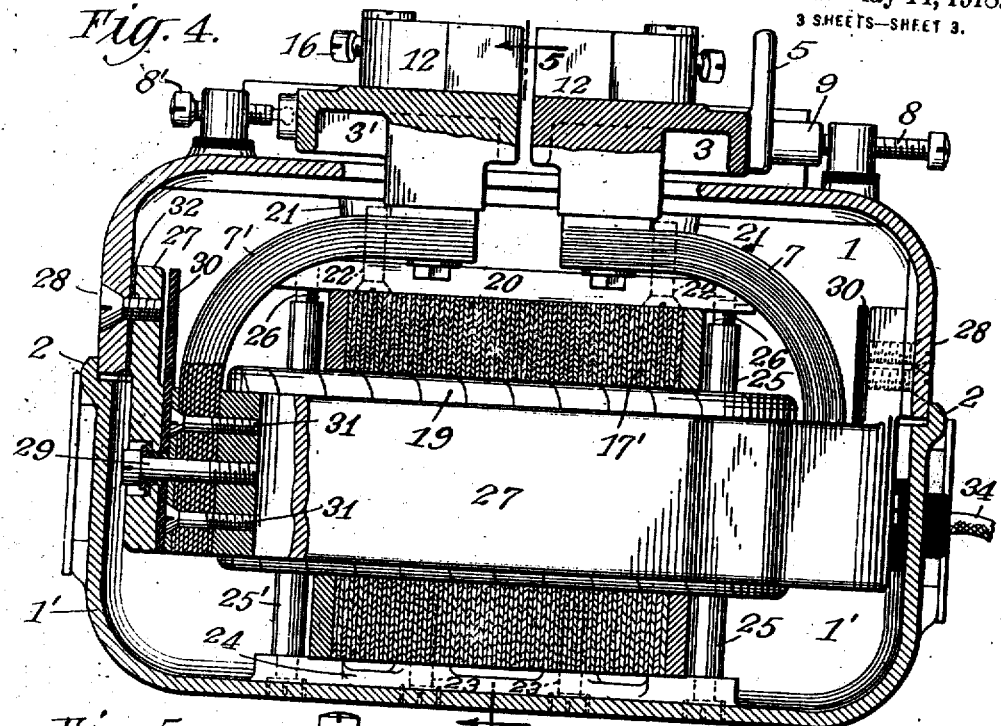
Fig. 4 is a section on the line 4—4 of Fig. 1 (also line 4—4 of Fig. 2) looking in the direction of the arrow.
Figure 5:
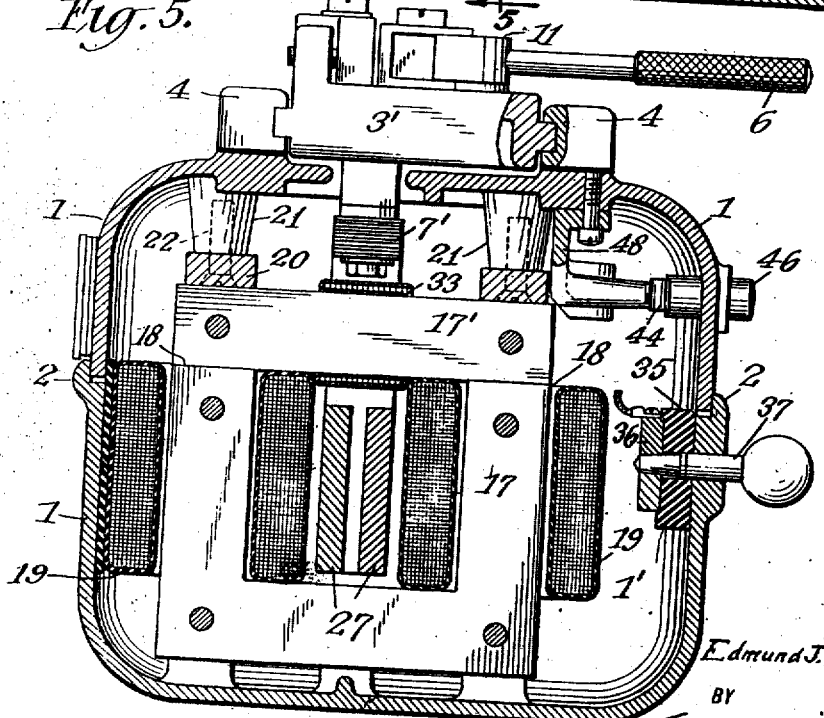
Fig. 5 is a section on the line 5—5 of Fig. 4 and also Fig. 1 looking in the direction of the arrow.

The workholding platens or slides furnished with the proper workholders for the welding or other operation are indicated respectively at 3, 3'. These platens work in guides 4, 4 constructed and insulated in the usual manner, the guides 4 for the platen 3, which latter is the platen which slides in the welding or other operation, being preferably furnished with ball-bearing guides as indicated in Fig. 8, and the guides 4 for the platen 3' which is ordinarily not employed in the welding operation but which is preferably nevertheless made adjustable, being plain guides as shown in Fig. 5. The platens are mounted on the exterior section 1 of the casing as shown.

6 indicates the handles used for operating the workholding clamps or jaws. 5 is an arm or handle projecting from the platen 3 and used for retracting the same after the completion of the welding operation and when it is desired to place it in position for insertion of a new piece of work in the clamps.

7 indicates the flexible laminated lead of the secondary suitably attached, as shown, to platen 3, and 7' the corresponding lead for the platen 3', these leads being the terminal sections of the two-turn or other secondary usually employed in this class of apparatus. 8 indicates an adjusting screw engaging the tube or casing 9 which incases the spring 10 by which the movable platen 3 is pressed forward toward the opposite platen in the welding or other operation. 8' is an adjusting screw by which the platen 3' may be adjusted as to its position with respect to the platen 3. These parts are shown more in detail in Fig. 7.

11 indicates the cam operated by handle 6 and engaging a wear plate 15 upon the upper one 12 of each pair of clamping jaws, the lower or fixed jaws being indicated at 13. 14 indicates an adjusting screw for adjusting the position of the lower jaw with respect to the lower jaw on the opposite side. As shown, said jaws are pivotally mounted on the platens. An adjustment for the upper jaw with relation to its operating cam 11 is provided by a screw 16 engaged with the wear plate 15 and adapted to change the position of the wear plate upon an inclined way or guide on the upper portion of said jaw. By this construction a very accurate adjustment of the clamping jaw is attained to insure a good flat contact of the jaw with the work.

The laminated core of the transformer is made preferably in two parts 17, 17' which meet on the line 18 when the two sections of casing are secured together. Preferably and as shown, the larger section of the core is mounted on the rear portion 1' of the casing and the smaller section 17' on the front half or section 1 which carries the switches used in the operation of the apparatus as will be presently described.

19 indicates the primary coils of the transformer and 20 indicates the mounting for the section 17' of the core. Said mounting and section are fastened in place on the inside of the front half of section 1 of the casing by means of the screws 22 which enter bosses 21 as shown or in any other suitable manner. 24 indicates the mounting for the section 17 of the core and 23 the screws by which said section is fastened to the inside of the rear half or section 1' of the casing. The two sections of casing with the parts mounted thereon may be fastened together by means of the screws 26 passing from the exterior of the rear half through the insulating fiber bushings 25, into holes tapped in the mounting 20, or said halves or sections may be fastened together by any other suitable means permitting them to be readily detached from one another with the parts carried by said sections in place therein.

The secondary supplying the heating current for the work comprises two bars 27 the opposite ends respectively of which are secured to and in electrical connection with the section 1 of casing so that said casing will form a part of the secondary itself, whereby the two bars are combined into a two-turn secondary. The remaining ends of said bars are respectively connected to the leads 7, 7'. In order to form a good electrical connection between the ends of the bars 27 and the casing, said ends are preferably enlarged as shown at 27' and copper gauze or other suitable ductile and compressible conducting material is interposed between the meeting surfaces of said heads and the section 1 of casing whereby, on setting up the screws 28 which hold the heads 27' to the inside of the casing, good and firm electrical connection will be made for the joint in the secondary circuit at this point. 29 indicates screws by which the ends of the bars are mechanically secured together to form a firm and rigid structure, and 30 indicates a plate of insulation interposed between the abutting ends of said bars to insulate them from one another at this point, suitable insulating bushings being also provided for the screws 29 for the same purpose. Screws 31 fasten the flexible leads to the opposite ends of said bars respectively.

As will be seen, by this means the two bars are combined with the section 1 of the casing into a two-turn secondary whose circuit, following back from lead 7, for instance, is through upper bar 27, Fig. 2, to and through the section of casing 1 and then through lower bar 27 to the opposite lead 7'.

33 indicates a secondary coil mounted on a section of transformer secured within the section 1 of casing, said coil 33 being the usual auxiliary coil which supplies current for the magnet for the automatic cut-off switch. The insulated lead through which alternating current is supplied to the apparatus is indicated at 34, while 35 indicates the insulating portion of a connecting board, 36 a contact plate of said connecting board and 37 a plug thereof, said connecting board being mounted upon the section 1' and being provided with a suitable series of plates adapted for coöperation with plug 37 to enable the connections to be formed at will, or as may be desired and as usual in this and other electrical apparatus.

38 and 39 indicate respectively a casing for the two members of a plug switch by means of which the primary circuit is continued from the parts mounted on the section 1′ of the casing to the control switches mounted within the section 1 and used in the welding and other operations for starting the action and automatically stopping it when the platen 3 has moved forward under the action of its spring or other operating means. 40 indicates the contacts projecting from section 39 of the plug switch and adapted to enter openings in the section 38 and engage contacts therein in the usual manner, thereby to complete the connection after the two sections 1, 1′ are secured together and in obvious manner.

The operating magnet for the automatic cut-off switch of the apparatus indicated at 41 is mounted within the section 1, said magnet being supplied with current from the auxiliary coil 33 in the usual way. The armature 42 of the magnet is provided with a suitable catch, as shown, adapted to be engaged by an arm or lever 43 so long as the armature 42 is retracted. The arm 43 is a circuit closing and breaking arm of the automatic switch and closes a break of the primary circuit by engaging a spring 44 forming a part of said circuit when said arm is latched up, its latched position being brought about by the operation of the manual push-button 45 or other operating means as well understood in the art. The circuit closing arm 47 operated by starting button 46 closes another break in the primary circuit by engaging spring 44 and thereby places the primary circuit in condition for circulation of the primary current through the primary coil 19, thereby generating current in the secondary for heating the work in the clamping jaws.

When the magnet 41 is energized said primary circuit is broken by the release arm 43 and the flow of heating current stops. It may also be stopped at any time by releasing pressure on the starting button 46. The operation of the magnet 41 is brought about in the usual way by the closure of its circuit by means of a circuit closer carried by an arm 9 of the movable platen 3 and adapted to close circuit when the platen is permitted to move forward through the heating of the work. When the platen 3 is moved back by hand for insertion of a new piece of work, it is held retracted by an automatic catch the head of which, 53, passes into position to be engaged by the end 55 of a screw 54 mounted at the rear of the platen and provided with a suitable set nut 56. The head 53 of the catch is mounted upon a stem 50 and is suitably operated in one direction by means of the coil spring 52 normally tending to force the head 53 of the catch into position to be engaged by the end of screw 54. When the platen is drawn back by hand the stop or catch slips into position to hold it retracted. The stop or catch is withdrawn automatically so that the platen is ready to move forward under the action of its spring. To effect this I provide means coöperating with the means for closing the primary circuit and employed to start the welding or other operation. While said means might be applied to or associated with either of the means for closing the break in the primary circuit, I prefer to combine them with the button 45 which operates on the circuit closing and breaking switch 43.

A simple construction of device adapted for this use comprises the stem 49 seated in a suitable opening in the bracket or plate 48 which carries the switch parts and normally held in raised position by a spring 60. Said stem or rod 49 is engaged by lever 43 so as to be depressed when the lever is raised to close the circuit and is provided with a cam or incline on its lower end where it enters a slot 51 in the stem 50 for the automatic stop. As will be obvious, when the stem 49 is depressed, it withdraws the catch 53 and leaves the platen 3 free to move. When the platen is moved back the catch automatically engages and holds it while the work is being inserted and clamped in the jaws. After the work is inserted the operation is started by closing the primary circuit, in which act the operation of re-setting the automatic switch to close the break in the primary automatically withdraws the catch or stop to leave the platen free for the action of the means such as the spring 10 which moves it forward.

From the above description it will be seen that the secondary circuit with the necessary switches and push-buttons is complete in itself as a unit while the primary and the switches or connecting devices which it may be desired to use, constitutes another unit, and that by simply placing the two sections of the apparatus together the connections are established whereby the apparatus as a whole is put into operative electrical condition, the sections being held together by the screws 26 or other means employed for holding the two sections 1 and 1′ of the casing together.

70 indicates a strap or hanger by which the apparatus may be suspended and when used as a portable welder the strap 70 may be passed around the neck of the operator and thus be carried about.

As will be seen, I secure great compactness of the apparatus as a portable electric welder or other electric metal working device. In addition, parts such as the automatic switches, etc., are well protected from dirt or accidental derangement while at the same time maximum accessibility is secured.

What I claim as my invention is:—

1. In a metal working apparatus, an incased transformer having a two-turn secondary embodying a pair of conductors the opposite ends of which respectively are secured to and in electrical connection with the casing.

2. In an electric metal working apparatus having an incased transformer, a two-turn secondary for the said transformer comprising two substantially parallel bars the opposite ends of which respectively are secured to and in electrical connection with the casing, and flexible leads fastened to the remaining ends.

3. In an electric metal working apparatus, an incased transformer the secondary of which comprises two parallel metal bars or rods the opposite ends of which respectively have enlarged heads fastened to and in electrical contact with the casing and likewise fastened to but insulated from the remaining ends.

4. In an electric metal working apparatus, a casing forming a part of the secondary circuit and a secondary bar within the casing fastened thereto and having an interposed copper or other good conducting gauze between the contacting surfaces of the secondary bar and casing.

5. An electric metal working apparatus provided with a transformer, and a sectional casing therefor, the core of said transformer being made in sections secured respectively to the casing sections as and for the purpose described.

6. An electric metal working apparatus having an incased transformer, said casing being made in section one of which carries the primary and the other a secondary of said transformer.

7. An electric metal working apparatus having an incased transformer and a magnetically controlled switch for the primary of the transformer, said casing being made in sections within one of which the primary is mounted, the secondary and switch controlling magnet being mounted within the other section.

8. In an electric metal working apparatus, a sectional casing for the transformer one section of which casing is provided with workholders mounted on its exterior and has mounted within it a secondary bar whose circuit is completed through the transformer casing, an automatic switch magnet and a section of transformer core provided with an auxiliary secondary coil for operating said switch magnet.

9. In an electric metal working apparatus, a sectional casing one section of which carries within it the automatic switch for the primary and operating magnet for said switch together with a section of a transformer core and auxiliary coil mounted thereon, while the other section of said casing has mounted within it the portion of core carrying the primary coil combined with a plug switch the members of which are mounted respectively on the sections of casing and are adapted to connect the primary circuit through the contacts of the automatic switch.

10. In an electric metal working apparatus, an incased transformer the primary and a portion of the core of which are mounted within one section of a sectional casing while the secondary and remaining portion of the core are mounted within the other section, said secondary having its circuit completed through said section and being connected to workholders mounted on the exterior of said section.

11. In an electric metal working apparatus, a sectional casing for the transformer and operating or controlling parts of the apparatus having a secondary with necessary switches and push-buttons mounted within one section and forming a unit complete in itself, separable from the other section containing the primary coil and the connecting board to which the primary circuit leads are joined.

12. In an electric metal working apparatus having an incased transformer, a pair of secondary bars forming the elements of a two-turn secondary, said bars being attached respectively at their opposite ends to the metallic casing and in electrical connection therewith and being likewise secured to but insulated from the remaining ends to which the leads running through the workholders are secured, 13. In an electric metal working apparatus, a sectional casing one section of which carries outside the workholding platens and within it the automatic and manual switches and secondary of the transformer, together with a section of the core, while the remaining section of the casing carries the balance of the core and the primary.

14. In an electric metal working apparatus, the combination with a movable platen and a catch adapted to hold the same in retracted position, of means for closing a break in the primary circuit of the transformer and simultaneously and automatically freeing the platen from the catch.

15. The combination in an electric metal working apparatus, of a spring actuated platen, a catch adapted to hold the same in retracted position, an automatic switch, resetting means therefor and means coöperating with the re-setting means to operate the catch and free the platen when the switch is re-set.

16. In an electric metal working apparatus, the combination with a movable platen, of an automatic stop adapted to hold the platen in retracted position, means for closing the starting circuit and means coöperating with the latter to free the stop as and for the purpose described.

17. In an electric metal working apparatus, the combination of a platen, a catch therefor, a release switch, means for resetting the latter and coöperating means for withdrawing said catch when the release switch is re-set.

18. In an electric metal working apparatus, a sectional casing one section of which carries the platen on its outside and has the automatic and manual switches mounted within it together with the secondary of a transformer whose circuit embraces the casing, the other section of said casing having mounted upon it the portion of the transformer core and the primary coil thereof.

19. In an electric metal working apparatus, a work-clamping jaw, a plate adjustable along an inclined plane formed on said jaw and a jaw-operating cam engaging said plate.

20. In an electric metal working apparatus, a pivoted clamping jaw having a work-engaging surface and a surface inclined thereto, a plate carried by said jaw and seated on said inclined surface, adjusting means for varying the position of said plate longitudinally on said surface and a jaw-operating cam engaging said plate.

Signed at New York in the county of New York and State of New York this 12th day of May A. D. 1917.

EDMUND J. von HENKE.

Witnesses:
F. B. TOWNSEND,
IRENE LEFKOWITZ.